(12) United States Patent
Keller

(10) Patent No.: US 7,513,024 B2
(45) Date of Patent: Apr. 7, 2009

(54) METHOD FOR REPAIRING STRUCTURAL CRACKS

(75) Inventor: Jeffrey Stanley Keller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 11/210,540

(22) Filed: Aug. 24, 2005

(65) Prior Publication Data

US 2007/0050963 A1  Mar. 8, 2007

(51) Int. Cl.
  *B23P 6/02* (2006.01)
(52) U.S. Cl. ............ 29/402.15; 29/402.09; 29/402.14; 29/402.17
(58) Field of Classification Search ............... 29/402.09, 29/402.14, 402.11, 402.15, 402.17, 402.01, 29/402.05–402.07, 402.12–402.13, 557, 29/525.14; 606/212; 24/328
See application file for complete search history.

(56) References Cited

U.S. PATENT DOCUMENTS

| | | | |
|---|---|---|---|
| 408,080 A * | 7/1889 | Carroll | 606/212 |
| 3,192,820 A * | 7/1965 | Pitzer | 411/33 |
| 3,561,094 A * | 2/1971 | Harris | 29/402.16 |
| 3,709,088 A | 1/1973 | Pitzer | |
| 4,662,806 A | 5/1987 | Reed | |
| 4,824,279 A | 4/1989 | Casazza | |
| 4,845,828 A * | 7/1989 | Reed | 29/402.15 |
| 6,725,518 B2 | 4/2004 | Reed | |
| 6,901,758 B2 | 6/2005 | Grady et al. | |

OTHER PUBLICATIONS

Feirer, John; Tatro, Earl, Machine Tool Metalworking, 1961, McGraw Hill Book Company, 139*.*
Ebel, Ulrich, Grinding Hog and Cob Mills, Jan. 8, 2005, http://webdustrial.com/nwmw/HogMill.html.*

* cited by examiner

*Primary Examiner*—Sam Chuan Yao
*Assistant Examiner*—John Becker
(74) *Attorney, Agent, or Firm*—William Scott Andes, Esq.; Armstrong Teasdale LLP

(57) ABSTRACT

A crack repair method includes forming a pair of holes into a surface of a structural workpiece on opposite sides of the crack, forming a slot into the surface of the structural workpiece to connect the holes on opposite sides of a crack, installing the cammed drawbolt assembly into the holes and slot, drawing said crack closed by actuating the cammed drawbolt assembly into a closed position and securing the drawbolt into the closed position.

9 Claims, 6 Drawing Sheets

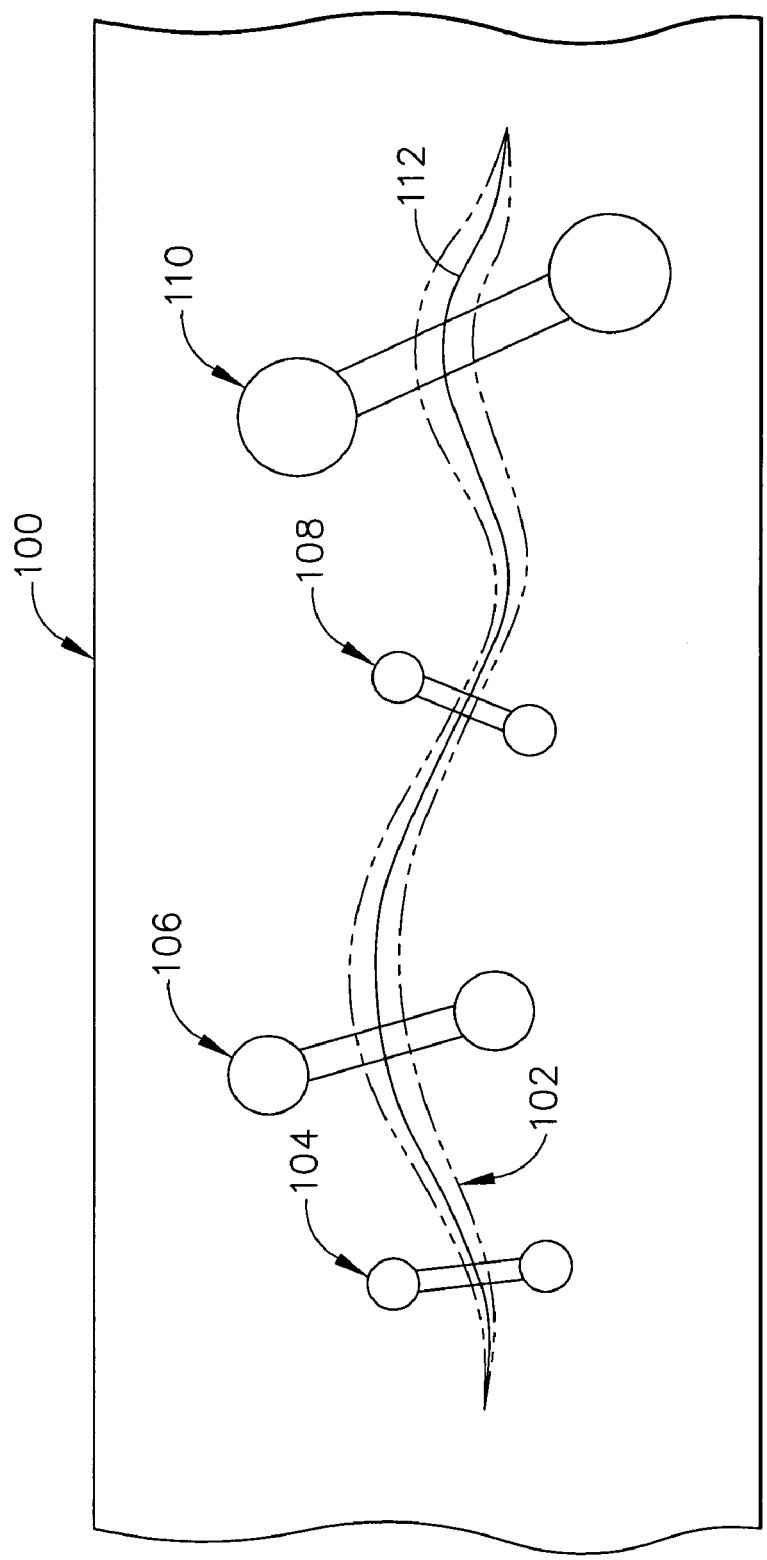

METHOD FOR REPAIRING STRUCTURAL CRACKS

BACKGROUND OF THE INVENTION

This invention relates generally to repairing cracks in workpieces, and more particularly, to a method for repairing cracks in structural workpieces using a cammed drawbolt approach.

Cracks occur in structural materials during manufacturing processes such as casting of metal or ceramic objects and molding of synthetic material objects. Cracks also occur during use of structural objects due to causes including stress, fatigue, aging or other conditions of use. The material of the structural object and the conditions of its use are taken into account in determining the most practical repair technique. X-ray, fluorescent penetrant or various other inspection techniques are used to evaluate the characteristics of cracks and the need and practicality for repair. Some cracks may be small enough that they represent no risk to performance, but others will require repair to allow safe and compliant operation of the machine, such as a power generator, locomotive, ship propulsion engine or other system. Many cracks may best be repaired by a technique not requiring extreme heating as occurs with, for example, welding or soldering. Extreme heat may induce stresses in the structural workpiece material which may be difficult or expensive to remedy. Bonding using chemical agents which soften a portion of a structural workpiece may be undesirable, because solvents or other softening agents may damage the material of the structural workpiece surfaces or require expensive or complex treatments to remove solvent residue. Large structural components, for example, diesel engine cast components, such as frames and engine blocks, are expensive to manufacture. Maintaining a spare engine in a user's inventory is rarely done due to the associated inventory costs, and waiting to re-engine a power generator, locomotive, ship or other industrial user may create considerable cost and inconvenience for the user. A technically sound, low-cost crack repair method is needed to facilitate reliable repair of cracks to minimize downtime and overall life cycle cost. Some materials other than metals have characteristics, such as limited temperature tolerance or corrosion, which make repair by techniques using heat or chemical bonding difficult or impossible.

BRIEF DESCRIPTION OF THE INVENTION

A crack repair method includes forming a pair of holes on opposite sides of a crack, forming a slot into the structural workpiece to connect the holes on opposite sides of a crack, installing a cammed drawbolt assembly into the holes and slot, drawing said crack closed by actuating the cammed drawbolt assembly into a closed position and securing the drawbolt into the closed position.

BRIEF DESCRIPTION OF THE DRAWINGS

FIG. 10 is a schematic plan view of the another type of structural workpiece repair.

DETAILED DESCRIPTION OF THE INVENTION

Figure 1:
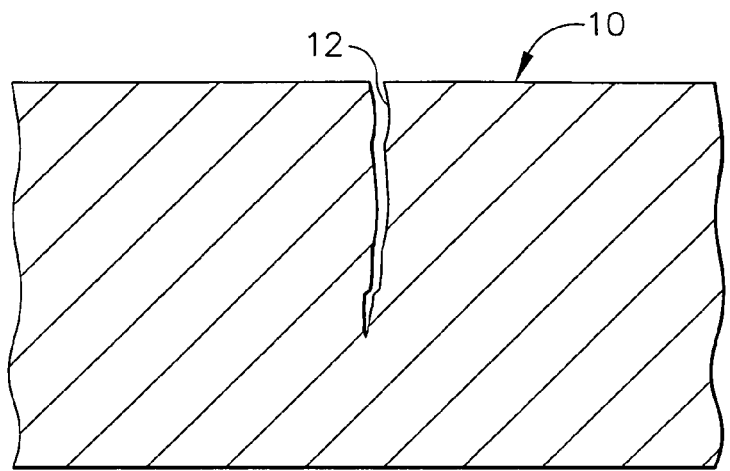
FIG. 1 is a schematic, partial cross-sectional side view of a structural workpiece including a crack to be repaired.
Figure 2:
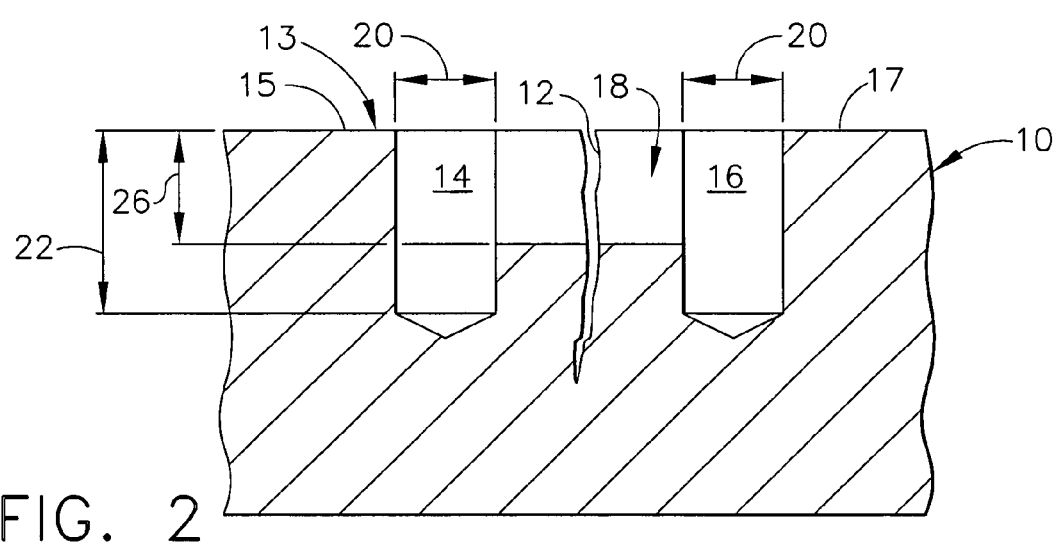
FIG. 2 is a schematic, partial cross-sectional view of a structural workpiece as shown in FIG. 1 prepared for repair.
Figure 3:
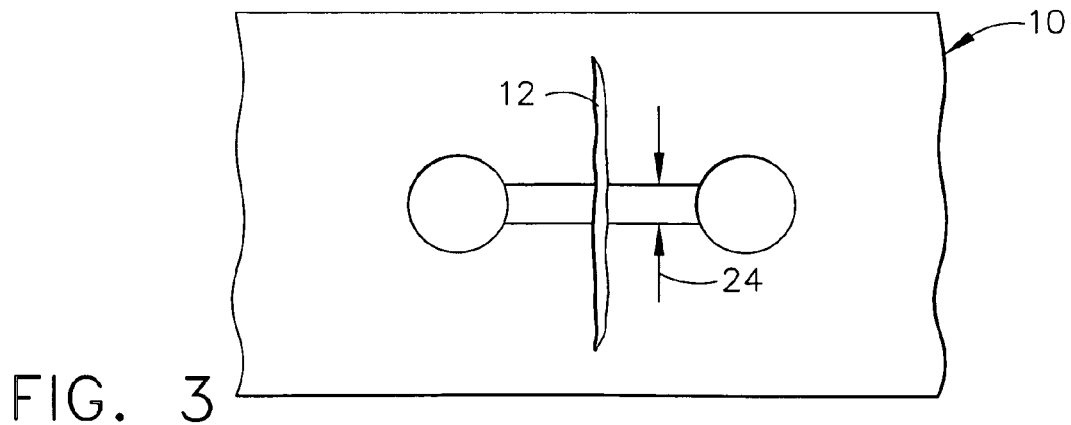
FIG. 3 is a schematic, plan view of a structural workpiece as shown in FIG. 2.

FIG. 1 schematically illustrates a structural workpiece 10 containing a crack 12. One step in a method of repairing structural cracks is shown schematically in FIGS. 2 and 3. A first hole 14 is formed into surface 13 of structural workpiece 10 on a first side 15 of crack 12 and a second hole 16 is formed into surface 13 on the opposite side 17 of crack 12. A slot 18 is formed into the structural workpiece 10 of sufficient length to join the first hole 14 and second hole 16. Although the surface 13 is schematically illustrated as a planar surface, the surface may be of other shapes, so long as the holes 14, 16 and slot 18 penetrate the structural workpiece to extend below the surface 13. The diameter 20 and depth 22 of the holes 14 and 16 and the width 24, see FIG. 3, and depth 26 of the slot 18 necessary to accomplish a repair are selected based upon the structural workpiece material and the length, width and depth of crack 12. The position of the first hole 14 and the position of the second hole 16 are selected so that the slot 18 crosses the crack 12 at a predetermined orientation relative to crack 12, typically approximately perpendicular to said crack 12, but at other angular orientations where the shape of the surface 13 requires force to be applied at an angle other than perpendicular. The technique used to form the holes and the slot is selected to be appropriate for use on the material of the structural workpiece. For example, for cast metals and ceramics the holes would typically be drilled and reamed, and the slots would be milled using cutting tools suited for the material. For structural plastics and composite materials, other material removal techniques, such as chemical etching, would be employed.

Figure 4:
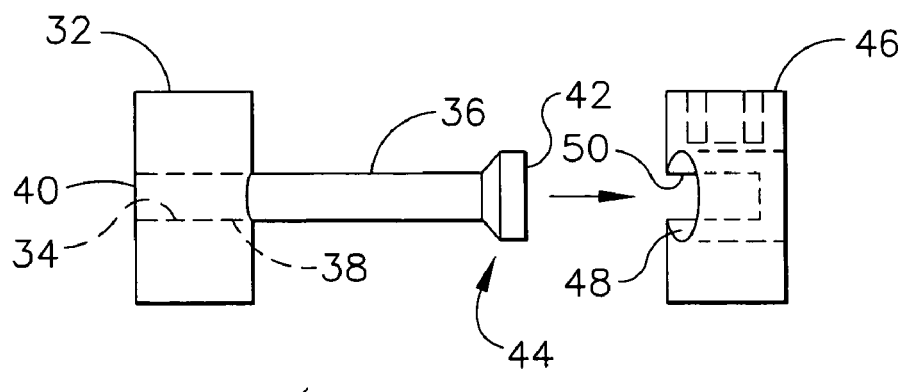
FIG. 4 is schematic side view illustrating a cammed drawbolt assembly.

A cammed drawbolt assembly 30 for repairing the structural workpiece 10 is shown in FIG. 4. The cammed drawbolt assembly 30 includes a dowel 32 having a thread 34 to receive a drawbolt 36 at thread 38 at one end 40 and a shaped head 42 at the other end 44, and a cammed dowel 46 having a through-hole 48 and cam slot 50 shaped in a complementary shape to receive the shaped head 42 of the drawbolt 36. The dimensions and materials of the dowels 32, 46 and the drawbolt 36 are selected to provide the leverage required for a particular structural workpiece to be repaired and to be compatible with the operating conditions, such as heat, vibration, lubricants and other factors, in which the structural workpiece 10 operates. For example, a drawbolt assembly used to repair a cast metal structural workpiece 10 would typically be a metal drawbolt assembly.

Figure 5:
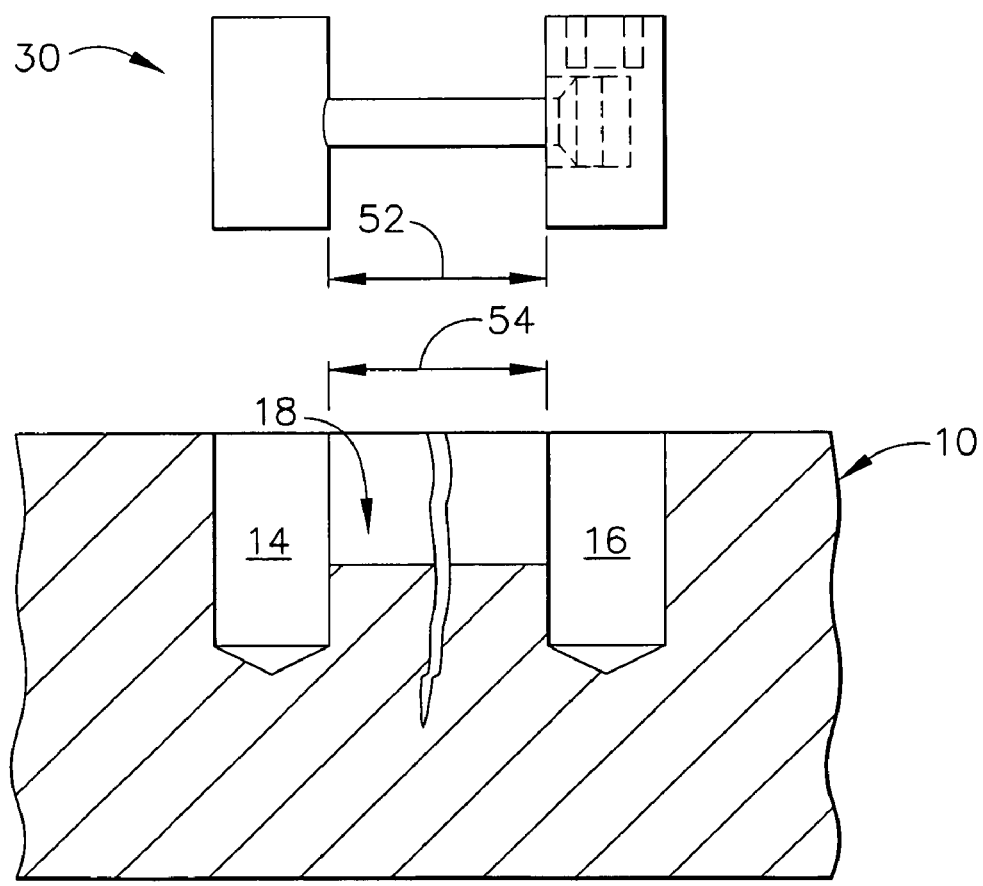
FIG. 5 is a schematic, partial cross-sectional view of a structural workpiece prepared for repair with a cammed drawbolt assembly positioned for installation into the structural workpiece.
Figure 7:
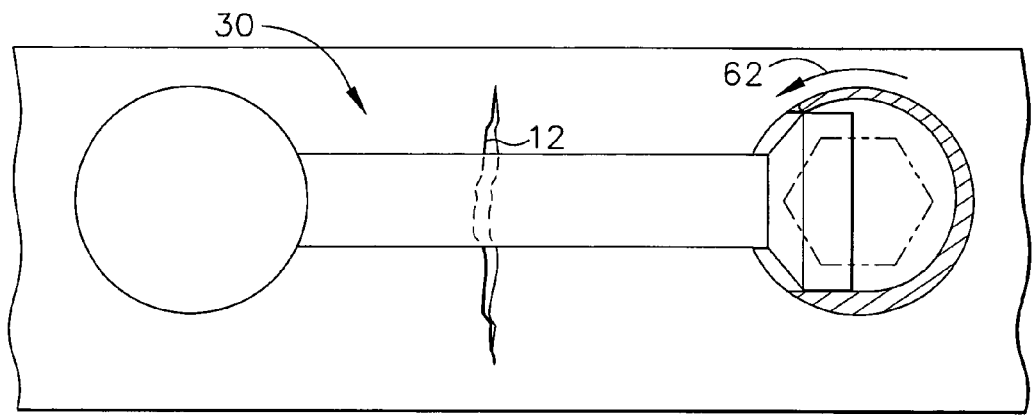
FIG. 7 is a schematic, partial plan view of a structural workpiece and a cammed drawbolt assembly positioned to close a crack in the structural workpiece.

As shown schematically in FIG. 5, the dimensions of the dowels 32, 46 and the drawbolt 36 are selected so that each of them will fit the respective holes 14, 16 and slot 18 in the structural workpiece 10. The cammed drawbolt assembly 30 is assembled by threading the drawbolt 36 into the thread 34 of dowel 32 and inserting the shaped head 42 into through-hole 48, so that the exposed length 52 of drawbolt 36 matches the spacing 54 between holes 14 and 16. The cammed drawbolt assembly 30 is placed into the holes 14, 16 and slot 18 and a hex-headed tool 60 is inserted into the cammed dowel 46. The drawbolt 36 is actuated by rotation of the cammed dowel 46 in the direction shown by arrow 62 in FIG. 7 to pull shaped head 42 of the drawbolt 36 into the cam slot 50 to draw the shaped head 42 into the cammed dowel 46 and thereby to close crack 12.

Figure 6:
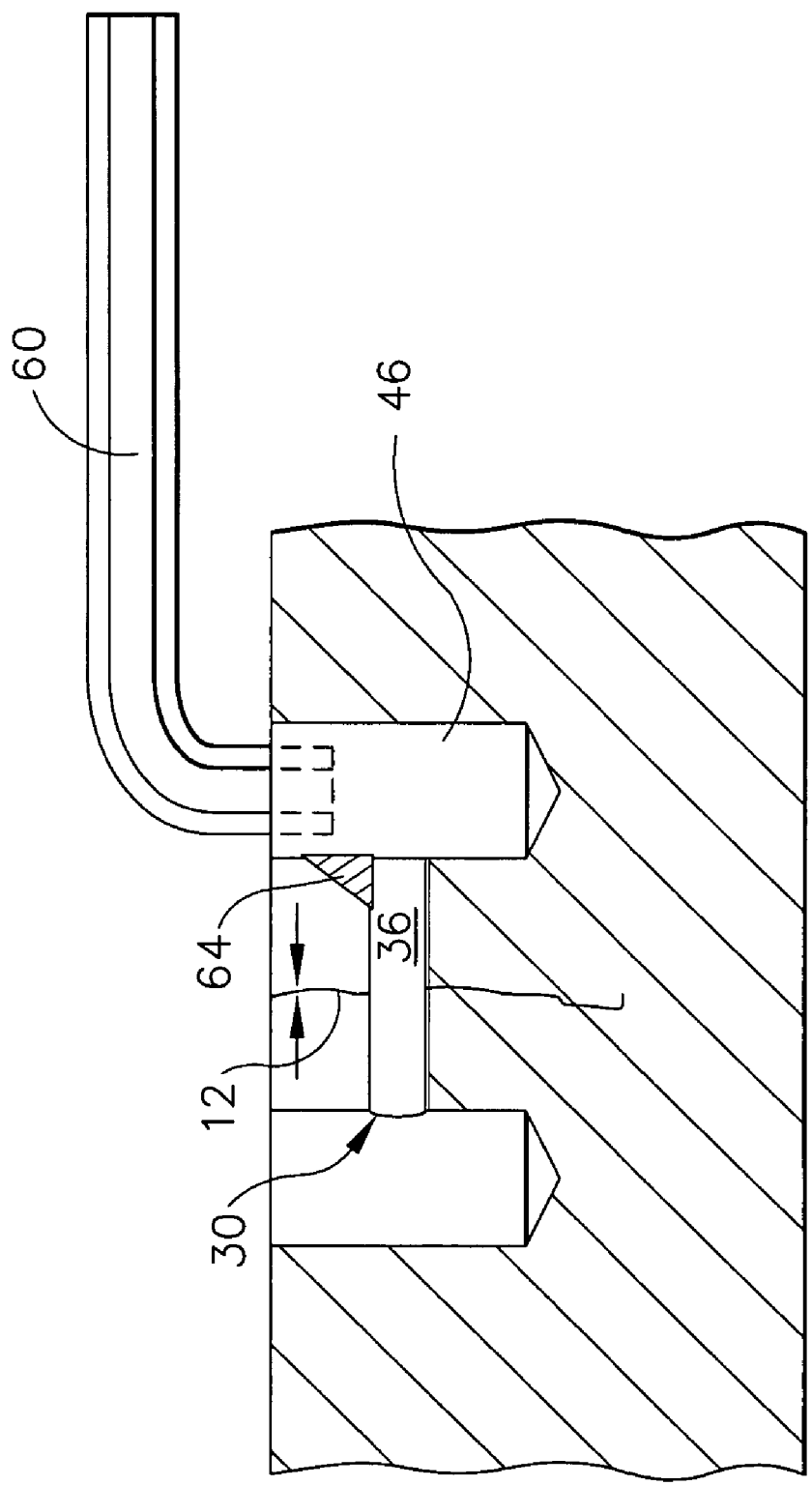
FIG. 6 is a schematic, partial cross-sectional view of a cammed drawbolt in place after actuation to close the crack in the structural workpiece.
Figure 8:
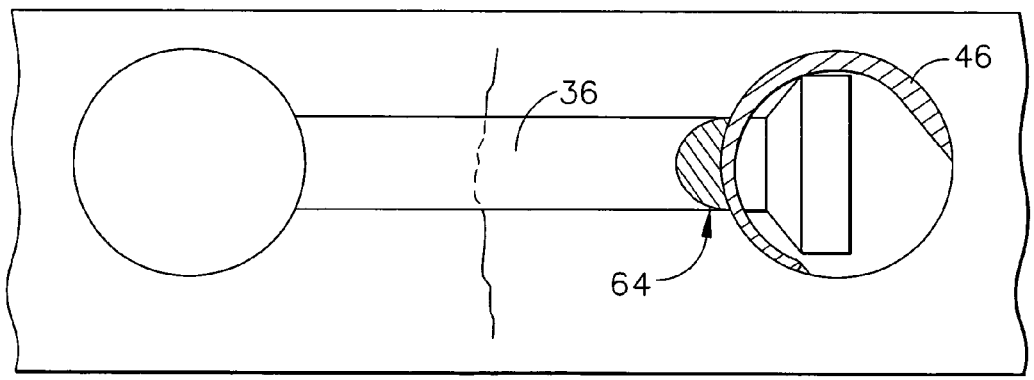
FIG. 8 is a schematic, partial plan view including a partial cut-away illustration of a cammed drawbolt in its closed position.

As shown in FIGS. 6 and 8, after the crack 12 is closed by rotation of hex-headed tool 60, drawbolt 36 and cammed dowel 46 are bonded together, for example by a tack weld 64, to secure the cammed dowel 46 from rotation. This will create a "stitch" to secure the material of the structural workpiece 10 from further cracking. Although a single stitch is illustrated and described, it will be understood that many cracks are deep enough or long enough to require more than one stitch to repair. The operator will evaluate the condition of the structural workpiece and select the number of stitches to be installed in a material to provide adequate strength for the application for which the structural workpiece is used.

Figure 9:
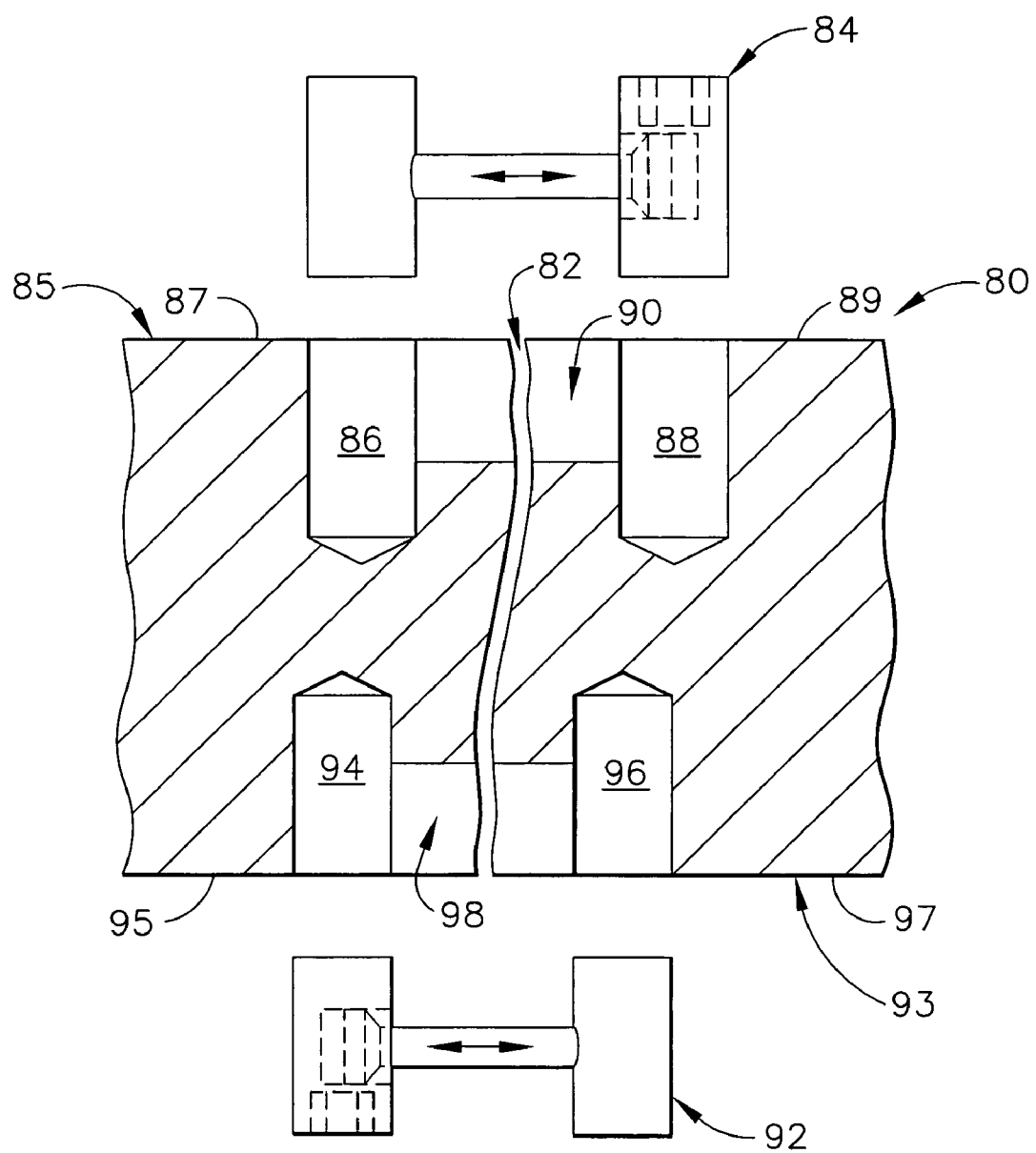
FIG. 9 is a schematic partial cross-sectional view of an alternative structural workpiece repair.

In an alternative embodiment of the method of crack repair, as shown in FIG. 9, a structural workpiece 80 may be repaired from either or both sides if necessary, for example, where a crack 82 extends through the structural workpiece 80 and the operational location and application of structural workpiece 80 allows access to both sides 85 and 93 of structural workpiece 80. Hole 86 is formed into surface 85 of structural workpiece 80 on a first side 87 of crack 82 and hole 88 is formed into surface 85 on the opposite side 89 of crack 82. Slot 90 is formed into surface 85 to connect holes 86 and 88. Hole 94 is formed into surface 93 of structural workpiece 80 on a first side 95 of crack 82 and hole 96 is formed into surface 93 on the opposite side 97 of crack 82. Slot 98 is formed into surface 93 to connect holes 94 and 96. A first drawbolt assembly 84 is assembled and inserted into holes 86 and 88 and slot 90, and a second drawbolt assembly 92 is assembled and inserted into holes 94, 96 and slot 98. As crack 82 may be of different size and shape on one side of structural workpiece 80 from the crack on the other side of structural workpiece 80, drawbolt assembly 84 and the dimensions of holes 86, 88 and slot 90 are sized to apply the needed pressure on one side of structural workpiece 80 and drawbolt assembly 92 and the dimensions of holes 94, 96 and slot 98 are sized to apply the needed pressure on the other side of structural workpiece 80.

FIG. 10 is a schematic plan view illustrating a repaired structural workpiece 100 showing that the shape, width and depth of the crack 102 shown in hidden line at particular locations may be taken into account in selecting the details of the stitching to perform the repair. As shown, cammed drawbolt assemblies 104, 106, 108 and 110 of varying sizes are used to close crack 102 to a line 112. Where the crack is an irregular shape and irregular width, the number, spacing and size of individual stitches used for the repair are selected by the operator to provide the necessary reinforcement. The holes and slot for each of the cammed drawbolt assemblies 104, 106, 108 and 110 are formed so that each drawbolt of the cammed drawbolt assemblies 104, 106, 108 and 110 is oriented generally perpendicularly to the crack 102. Where the shape of the workpiece surface and the shape and size of the crack require, other orientations relative to a crack to be repaired may be selected for the drawbolt position.

While the invention has been described in terms of various specific embodiments, those skilled in the art will recognize that the invention can be practiced with modification within the spirit and scope of the claims.

What is claimed is:

1. A method for repairing a crack in a structural workpiece comprising:
    forming a first hole into a surface of a structural workpiece to be repaired on a first side of a crack;
    forming a second hole into said surface of said structural workpiece to be repaired on a second side of said crack opposite said first side;
    forming a slot into said surface of said structural workpiece of a length sufficient to connect said first hole and said second hole;
    after forming said slot, assembling a cammed drawbolt assembly by: threading a first dowel threaded to a first threaded end of a drawbolt; and connecting a cammed dowel having a through-hole and cammed slot to a shaped head disposed at an other end of said drawbolt and spaced from said first dowel by a length corresponding to the length of said slot;
    installing a cammed drawbolt assembly entirely within said holes and slot in said structural workpiece;
    drawing said crack closed by actuating said cammed drawbolt assembly into a closed position; and
    securing said drawbolt in said closed position.

2. The method of claim 1, wherein:
    forming a first hole comprises drilling and reaming a first hole in said structural workpiece;
    forming a second hole comprises drilling and reaming a second hole in said structural workpiece; and
    forming a slot comprises milling a slot into said structural workpiece.

3. The method of claim 2, wherein said first hole and said second hole are positioned relative to said crack so that said slot is oriented generally perpendicularly to said crack.

4. The method of claim 1, wherein said step of securing said drawbolt in a closed position comprises tack welding said cammed dowel to said drawbolt.

5. A method for repairing a crack in a structural workpiece comprising:
    forming a plurality of first holes into a surface of a structural workpiece to be repaired on a first side of a crack;
    forming a plurality of second holes into said surface of said structural workpiece to be repaired on a second side of said crack, each second hole corresponding to and opposite to a respective one of said plurality of first holes;
    forming a plurality of slots into said surface of said structural workpiece, each said slot respectively located to connect a first hole and a corresponding opposite second hole to form a plurality of pairs of holes joined by respective slots;
    after forming said slots, assembling a cammed drawbolt assembly by: threading a first dowel threaded to a first threaded end of a drawbolt; and connecting a cammed dowel having a through-hole and cammed slot to a shaped head disposed at an other end of said drawbolt and spaced from said first dowel by a length corresponding to the length of said slot;
    installing a cammed drawbolt assembly entirely within each respective one of said plurality pairs of holes joined by a slot in said structural workpiece;
    drawing said crack closed by actuating each said cammed drawbolt assembly into a closed position; and
    securing each said drawbolt in said closed position.

6. The method of claim 5, wherein the respective first hole and second hole are formed in respective positions relative to said crack, so that said respective slot is disposed generally perpendicularly to said crack.

7. The method of claim 6, wherein the dimensions of each respective cammed drawbolt assembly are selected to correspond to the dimensions of said respective pairs of first and second holes joined by a slot.

8. A method for repairing a crack through a structural workpiece comprising:
   forming a plurality of first holes into a first surface of a structural workpiece to be repaired on a first side of a crack;
   forming a plurality of second holes into said surface of said structural workpiece to be repaired on a second side of said crack, each said second hole corresponding to and opposite to a respective one of said plurality of first holes;
   forming a plurality of slots into said first surface of said structural workpiece, each slot respectively located to connect a first hole and a corresponding second hole to form a plurality of pairs of holes joined by respective slots in said first surface;
   forming a plurality of first holes into a second surface of a structural workpiece to be repaired on a second side opposite to said first surface on a first side of said crack;
   forming a plurality of second holes into said second surface of said structural workpiece to be repaired, each said second hole corresponding to and opposite to a respective one of said plurality of first holes into said second surface;
   forming a plurality of slots into said second surface of said structural workpiece, each slot respectively located to connect a first hole and a corresponding second hole to form a plurality of pairs of holes joined by respective slots in said second surface;
   after forming said slots, assembling a cammed drawbolt assembly by: threading a first dowel threaded to a first threaded end of a drawbolt; and connecting a cammed dowel having a through-hole and cammed slot to a shaped head disposed at an other end of said drawbolt and spaced from said first dowel by a length corresponding to the length of said slot;
   installing a cammed drawbolt assembly entirely within each said pair of holes and slot in each surface of said structural workpiece;
   drawing said crack closed by actuating each said cammed drawbolt assembly into a closed position; and
   securing each said drawbolt in said closed position.

9. The method of claim 8, wherein each said first hole and respective second hole are positioned relative to said crack so that each said slot is oriented generally perpendicularly to said crack.

* * * * *